(12) United States Patent
Adachi et al.

(10) Patent No.: US 10,400,304 B2
(45) Date of Patent: Sep. 3, 2019

(54) METHOD FOR REMOVING COPPER FROM LITHIUM ION BATTERY SCRAP AND METHOD FOR RECOVERING METALS

(71) Applicant: JX NIPPON MINING & METALS CORPORATION, Tokyo (JP)

(72) Inventors: Ken Adachi, Hitachi (JP); Junichi Arakawa, Tsuruga (JP); Junichi Ito, Tsuruga (JP)

(73) Assignee: JX NIPPON MINING & METALS CORPORATION, Tokyo (JP)

( * ) Notice: Subject to any disclaimer, the term of this patent is extended or adjusted under 35 U.S.C. 154(b) by 0 days.

(21) Appl. No.: 15/563,205

(22) PCT Filed: Mar. 29, 2016

(86) PCT No.: PCT/JP2016/060235
§ 371 (c)(1),
(2) Date: Sep. 29, 2017

(87) PCT Pub. No.: WO2016/159002
PCT Pub. Date: Oct. 6, 2016

(65) Prior Publication Data
US 2018/0087127 A1 Mar. 29, 2018

(30) Foreign Application Priority Data

Mar. 31, 2015 (JP) .................................. 2015-072677

(51) Int. Cl.
| | | |
|---|---|---|
| C22B 3/00 | (2006.01) | |
| C22B 3/08 | (2006.01) | |
| B09B 3/00 | (2006.01) | |
| B09B 5/00 | (2006.01) | |
| C25C 1/08 | (2006.01) | |
| C22B 3/06 | (2006.01) | |
| C22B 7/00 | (2006.01) | |
| C22B 23/00 | (2006.01) | |
| C22B 26/12 | (2006.01) | |
| H01M 10/0525 | (2010.01) | |

(52) U.S. Cl.
CPC .................. C22B 3/08 (2013.01); B09B 3/00 (2013.01); B09B 5/00 (2013.01); C22B 3/06 (2013.01); C22B 7/00 (2013.01); C22B 23/00 (2013.01); C22B 26/12 (2013.01); C25C 1/08 (2013.01); H01M 10/0525 (2013.01); Y02P 10/234 (2015.11); Y02P 10/236 (2015.11); Y02W 30/84 (2015.05)

(58) Field of Classification Search
CPC ................ C22B 3/06–10; C22B 26/12; C22B 23/0415–0438; B09B 3/00; H01M 10/0525; H01M 10/54; H01M 6/52
USPC .................. 423/27; 429/49; 75/726–731
See application file for complete search history.

(56) References Cited

U.S. PATENT DOCUMENTS

| | | | | |
|---|---|---|---|---|
| 3,902,896 | A * | 9/1975 | Borbely | ............... C22B 3/46 75/726 |
| 4,450,002 | A * | 5/1984 | Durkee | ............... C02F 1/008 423/112 |
| 2013/0312254 | A1* | 11/2013 | Kim | ............... C01D 15/08 29/623.1 |

FOREIGN PATENT DOCUMENTS

| | | | |
|---|---|---|---|
| JP | 11-097076 | * | 4/1999 |
| JP | 2005-270860 A | | 10/2005 |
| JP | 2012-1750 A | | 1/2012 |
| JP | 2012-38572 A | | 2/2012 |

OTHER PUBLICATIONS

Partial translation of Japan 2012-1750. (Year: 2012).*
Partial translation of Japan 2012-038572. (Year: 2012).*
Partial translation of Japan 2005-270860. (Year: 2005).*
Translation of Japan 11-097076. (Year: 1999).*
International Preliminary Report on Patentability and English translation of the Written Opinion of the International Searching Authority (forms PCT/IB/373, PCT/ISA/237 and PCT/IB/338), dated Oct. 12, 2017, for corresponding International Application No. PCT/JP2016/060235.
International Search Report, issued in PCT/JP2016/060235, PCT/ISA/210, dated Jun. 21, 2016.
Written Opinion of the International Searching Authority, issued in PCT/JP2016/060235, PCT/ISA/237, dated Jun. 21, 2016.
Extended European Search Report dated Oct. 25, 2018, issued in European Patent Application No. 16772883.1.

* cited by examiner

*Primary Examiner* — Steven J Bos
(74) *Attorney, Agent, or Firm* — Birch, Stewart, Kolasch & Birch, LLP (57) ABSTRACT

The present invention provides a method for removing copper from lithium ion battery scrap containing copper, comprising a leaching step of adding the lithium ion battery scrap to an acidic solution and leaching the lithium ion battery scrap under a condition that an aluminum solid is present in the acidic solution; and a copper separating step of separating copper contained in the acidic solution as a solid from the acidic solution, after the leaching step.

7 Claims, 9 Drawing Sheets

LCO + Cu Foil + Al Foil (Equivalent Sulfuric Acid Leaching)

FIG. 7

LCO + Cu Foil (Equivalent Sulfuric Acid Leaching)

METHOD FOR REMOVING COPPER FROM LITHIUM ION BATTERY SCRAP AND METHOD FOR RECOVERING METALS

TECHNICAL FIELD

The present invention relates to a method for removing copper from lithium ion battery scrap containing copper and a method for recovering metals. More particularly, the present invention proposes a technique that allows effective and easy removal of copper from the lithium ion battery scrap to contribute to improvement of processing efficiency and reduction of costs.

BACKGROUND ART

Lithium ion batteries used in various industrial fields including various electronic devices employ lithium metal salts containing manganese, nickel and cobalt as positive electrode active materials. Recently, with an increased amount of lithium ion batteries to be used and expansion of the range of use, an amount of the lithium ion batteries to be discarded has been increased due to product life of the batteries and defects in the manufacturing processes.

Under such circumstances, there is a need for easily recovering expensive elements such as nickel and cobalt as stated above from a large amount of lithium ion battery scrap with a relatively low cost in order to reuse the elements.

In order to process the lithium ion battery scrap for recovering the valuable metals, the lithium ion battery scrap in the form of powder or particle obtained through each step such as roasting, crushing and sieving as required are firstly acid-leached using hydrogen peroxide water and lithium, nickel, cobalt, manganese, iron, copper, aluminum or the like that can be contained therein are dissolved in the solution to obtain a leached solution.

The leached solution is then subjected to a solvent extraction method to sequentially separate respective metal elements. In this case, the leached solution is sequentially subjected to a plurality of stages of solvent extraction or neutralization depending on the metals to be separated and each solution obtained in each stage is subjected to stripping, electrolysis, carbonization or other treatments, in order to separate each metal leached in the leached solution. More particularly, each valuable metal can be recovered by firstly recovering iron and aluminum, subsequently recovering manganese and copper, then cobalt, and then nickel, and finally leaving lithium in the aqueous phase.

SUMMARY OF THE INVENTION

Technical Problem

As described above, many treatments are required for separating and recovering each metal from the leached solution obtained by leaching the lithium ion battery scrap. Therefore, if a specific metal can be beforehand separated and removed from the metals contained in the leached solution as a solid, any required treatment for recovering the removed metal, among various treatments to be subjected to the leached solution for separating and recovering each metal, can be simplified or omitted in a subsequent recovery step, which will be effective from the viewpoint of processing efficiency and costs.

In particular, if a copper ion is contained at higher concentration in the leached solution, abnormal electrodeposition may occur, for example in an electrolysis step after stripping of cobalt by solvent extraction. Therefore, it is necessary to sufficiently lower the copper ion concentration in the leached solution.

An object of the present invention is to solve such problems, and to provide a method for removing copper from lithium ion battery scrap, which can effectively and easily remove copper contained in the lithium ion battery scrap to contribute to improvement of processing efficiency and reduction of costs, and a method for recovering metals.

Solution to Problem

As a result of intensive studies, the present inventors have found that if an aluminum solid is present in an acidic solution that added the lithium ion battery scrap containing copper when the lithium ion battery scrap are acid-leached, the leaching rate of copper can be maintained at an extremely low level under the condition that the aluminum solid is present in the acidic solution.

Then, the present inventors have considered that by using the findings, dissolution of copper can be suppressed or dissolved copper can be precipitated before the end of the leaching step, and then copper can be easily separated and removed as a solid.

Under such findings, the present invention provides a method for removing copper from lithium ion battery scrap containing copper, comprising a leaching step of adding the lithium ion battery scrap to an acidic solution and leaching the lithium ion battery scrap under a condition that an aluminum solid is present in the acidic solution; and a copper separating step of separating copper contained in the acidic solution as a solid from the acidic solution, after the leaching step.

Here, in the leaching step, the aluminum solid may be preferably aluminum powder contained in the lithium ion battery scrap.

Further, in the leaching step, the aluminum solid may be preferably added to the acidic solution before copper starts to dissolve.

In the copper removing method according to the present invention, the leaching step is terminated before the aluminum solid in the acidic solution completely dissolves and copper contained in the lithium ion battery scrap starts to dissolve.

In addition, the lithium ion battery scrap may contain nickel and/or cobalt.

In the leaching step, an amount of the aluminum solid to be present in the acidic solution may be preferably adjusted such that aluminum remains as a solid even after nickel and/or cobalt in the lithium ion battery scrap is completely dissolved.

Further, in the leaching step, a pH of the acidic solution when dissolving nickel and/or cobalt in the lithium ion battery scrap may be preferably from 0 to 2.0, and in the copper separating step, a pH of the acidic solution when separating the copper solid from the acidic solution may be preferably from 2.0 to 3.0.

The present invention provides a method for recovering at least one metal contained in the lithium ion battery scrap by using any one of the methods for removing copper from the lithium ion battery scrap as stated above, comprising a recovery step of recovering the at least one metal contained in a leached solution obtained by leaching the lithium ion battery scrap from the leached solution, after the copper separating step.

Advantageous Effects of Invention

According to the present invention, the leaching rate of copper can be maintained at a sufficiently lower level in the leaching step by leaching the lithium ion battery scrap under the condition that the aluminum solid is present in the acidic solution, so that in the subsequent copper separating step, copper contained as a solid in the acidic solution can be effectively and easily separated and removed.

As a result, it is possible to contribute to improvement of processing efficiency and reduction of costs in the subsequent processes and the like.

DESCRIPTION OF THE PREFERRED EMBODIMENTS

Embodiments of the present invention will be described in detail below.

The present invention provides a method for removing copper from lithium ion battery scrap containing copper, comprising a leaching step of adding the lithium ion battery scrap to an acidic solution and leaching the lithium ion battery scrap under a condition that an aluminum solid is present in the acidic solution; and a copper separating step of separating copper contained as a solid in the acidic solution from the acidic solution, after the leaching step.
(Lithium Ion Battery Scrap)

The lithium ion battery scrap may include so-called battery refuse, cathode materials with aluminum foils or positive electrode active materials discarded due to battery life, manufacturing defects or other reasons, or at least one of them, or, for example, materials obtained by roasting, chemically treating, crashing and/or sieving the battery refuse and the like as required. However, depending on the type of lithium ion battery scrap, such roasting, chemically treating, crushing and sieving are not necessarily required.

When the lithium ion battery scrap is the battery refuse for example, the lithium ion battery scrap may generally contain a single metal oxide composed of one element of lithium, nickel, cobalt and manganese making up the positive electrode active material, and/or a composite metal oxide composed of two or more elements, as well as aluminum, copper, iron and the like.

Alternatively, when the lithium ion battery scrap is the positive electrode active material, the scrap may generally contain the single metal oxide and/or the composite metal oxide as stated above. Further, when the lithium ion battery scrap is the cathode material with the aluminum foil, the scrap may further contain aluminum in addition to the single metal oxide and/or the composite metal oxide.

The lithium ion battery scrap to be subjected to the copper removing method of the present invention may contain at least copper. When carrying out a recovery step as described below, the lithium ion battery scrap may preferably further contain cobalt and/or nickel that are valuable metals, and more preferably cobalt and nickel.
(Leaching Step)

In the leaching step, the lithium ion battery scrap as stated above is added to sulfuric acid or other acidic solution to leach the scrap.

In this case, the lithium ion battery scrap may be leached by beforehand containing an aluminum solid in the lithium ion battery scrap or by separately adding the aluminum solid to the acidic solution, under the condition that the aluminum solid is present in the acidic solution.

This will allow effective suppression of an increase in the leaching rate of copper from the time when the aluminum solid is present in the acidic solution. The reason would be that aluminum is a less-noble metal than copper, i.e., aluminum has a lower standard oxidation reduction potential than copper, so that a dissolution reaction of aluminum proceeds earlier than that of copper contained in the lithium ion battery scrap, and copper already dissolved in the acidic solution is precipitated, although not limited to such theory.

It should be noted that although the aluminum solid may be present in the acidic solution throughout the period from the initiation to the end of the leaching step, the aluminum solid may present in the acidic solution at least in a certain period of time during the leaching step. While the aluminum solid is present, the dissolution of copper will be suppressed.

In the leaching step, only the lithium ion battery scrap containing aluminum powder may be added to the acidic solution as the aluminum powder originally contained in the lithium ion battery scrap for the aluminum solid to be present in the acidic solution. However, in addition to the lithium ion battery scrap, an aluminum solid may also be separately added to the acidic solution.

When the aluminum solid different from the lithium ion battery scrap is added to the acidic solution, the aluminum solid may be preferably aluminum powder obtained by processing other lithium ion battery scrap. This is because when recovering valuable metals such as nickel and cobalt from discarded lithium ion battery scrap and the like, the positive electrode active material containing the valuable metals may be peeled off from the aluminum foil to which positive electrode active materials for the cathode material adheres, and a large amount of aluminum powder may generated during the peeling processing, so that it is desirable to effectively utilize such aluminum powder.

In order to obtain the aluminum powder to be added to the acidic solution from the lithium ion battery scrap, for example, the cathode material of the lithium ion battery scrap is cut as required, and then crushed using a crusher such as a uniaxial shearing crusher until the cathode material becomes smaller than a predetermined size. Through such a process of granulating the cathode material, at least a part of the aluminum foil that is a current collector of the cathode material can be separated from the positive electrode active material as the aluminum powder. Further, the crushed material is then sieved with a sieve having a predetermined size to leave the aluminum powder on the upper side of the sieve, and to transfer the positive electrode active material to the lower side of the sieve. Thus, the aluminum powder can be obtained.

In the leaching step, when the aluminum solid is added to be present in the acidic solution, the aluminum solid may be preferably added to the acidic solution before copper contained in the lithium ion battery scrap in the acidic solution starts to dissolve. Thus, copper can be separated as a solid in the copper removing step as described below without dissolving a larger amount of copper.

Then, once the aluminum solid is completely dissolved, the dissolution of copper then begins. Therefore, it is advantageous that the leaching step is terminated before the aluminum solid in the acidic solution completely dissolves and copper contained in the lithium ion battery scrap starts to dissolve, in terms of being able to more effectively suppress the dissolution of copper.

When the lithium ion battery scrap contains cobalt and nickel and these metals are recovered in the subsequent recovery step, the leaching step can be terminated depending on the leaching rate of cobalt or nickel and the leaching rate of aluminum. That is, it is preferable to sufficiently dissolve cobalt and nickel while not dissolving copper as much as possible, in terms of improving the recovery rate of cobalt or the like.

Therefore, it is advantageous that when the lithium ion battery scrap contains cobalt and/or nickel, the aluminum solid is present in the acidic solution aluminum in such an amount that aluminum remains as a solid even after cobalt and/or nickel contained in the lithium ion battery scrap in the acidic solution is completely dissolved. In this case, cobalt and/or nickel are completely dissolved, but at this time more copper will be present as a solid in the acidic solution due to remaining of the aluminum solid, so that copper can be easily removed.

In the leaching step, the pH of the acidic solution is gradually increased so that cobalt and/or nickel is dissolved together with the aluminum solid, but copper is not dissolved. More particularly, the pH of the acidic solution when dissolving cobalt and/or nickel may be from 0 to 2.0. If the pH is too high, then sufficient leaching velocities of cobalt and nickel may not be achieved. On the other hand, if the pH is too low, the leaching will rapidly proceed, copper will be leached out, and costs will be increased due to pH adjustment if there is a need for raising the pH in the subsequent step.

In the leaching step, the leaching time from the time when the lithium ion battery scrap is added to the acidic solution to the end of the leaching may be from 0.5 hours to 10 hours. If the reaction time is too short, cobalt or nickel desired to be dissolved may not be sufficiently dissolved. On the other hand, if the leaching time is too long, the dissolution of the aluminum solid may be terminated and the dissolution of copper may begin. A more preferable range of the leaching time may be from 1 hour to 5 hours, and more preferably from 1 hour to 3 hours.

(Copper Separating Step)

After the above leaching step, metals other than copper, in particular cobalt and nickel, are substantially dissolved, and the acidic solution in which copper remains as a solid can be subjected to the copper separating step by a known method such as solid-liquid separation to separate a leached residue from a leached solution. As the aluminum solid is present in the acidic solution in the leaching step, copper will remain and precipitate as a solid in the acidic solution. Therefore, the leached residue obtained in the copper separating step contains a large amount of copper solid, whereas the leached solution is substantially free of copper.

The pH of the acidic solution when separating the copper solid may be from 2.0 to 3.0. That is, if the pH of the acidic solution in the copper separating step is too high, precipitation of a hydroxide will occur and an ability to separate the metal components will deteriorate. Further, the pH adjustment cost in the subsequent process will increase. If the pH is too low, the leaching of aluminum may proceed.

(Recovery Method of Metal)

When the dissolved valuable metals such as nickel and cobalt are present in the leached solution after removal of copper, which is obtained by leaching the lithium ion battery scrap according to the method for removing copper as described above, the recovery method of metals can be carried out in order to recover the valuable metals from the leached solution.

In the recovery method, the leached solution obtained as described above is subjected to, for example, general solvent extraction or neutralization or like to recover respective metals including the valuable metals dissolved therein.

In one embodiment of the recovery method, the lithium ion battery scrap containing, for example, lithium, manganese, nickel, cobalt, copper, iron and aluminum is subjected to the leaching step and the copper separating step as described above, as illustrated in FIG. 1. The leached solution obtained by separating copper will be substantially free of copper due to removal of copper.

Figure 1:
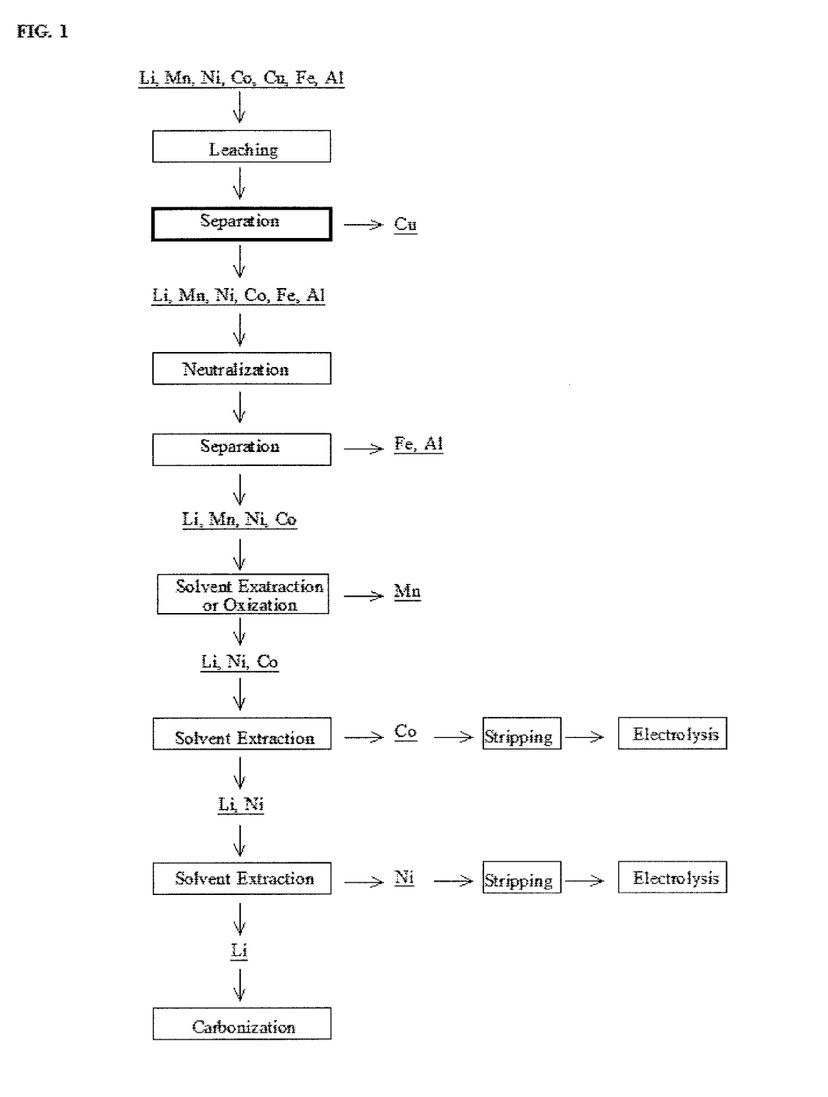
FIG. 1 is a flow chart showing one embodiment of a metal recovering method according to the present invention.

The leached solution is then subjected to neutralization and separation for removing iron and aluminum. Subsequently, manganese is removed from the resulting solution by solvent extraction or oxidation, and cobalt and nickel are sequentially recovered by solvent extraction with an extracting agent depending on each metal, and lithium is then left in the aqueous phase. Cobalt in the solvent can be transferred back to the aqueous phase by stripping and recovered by electrowinning. Nickel in the solvent can also be recovered by stripping and electrowinning. Lithium can be carbonated and recovered as lithium carbonate.

Figure 2:
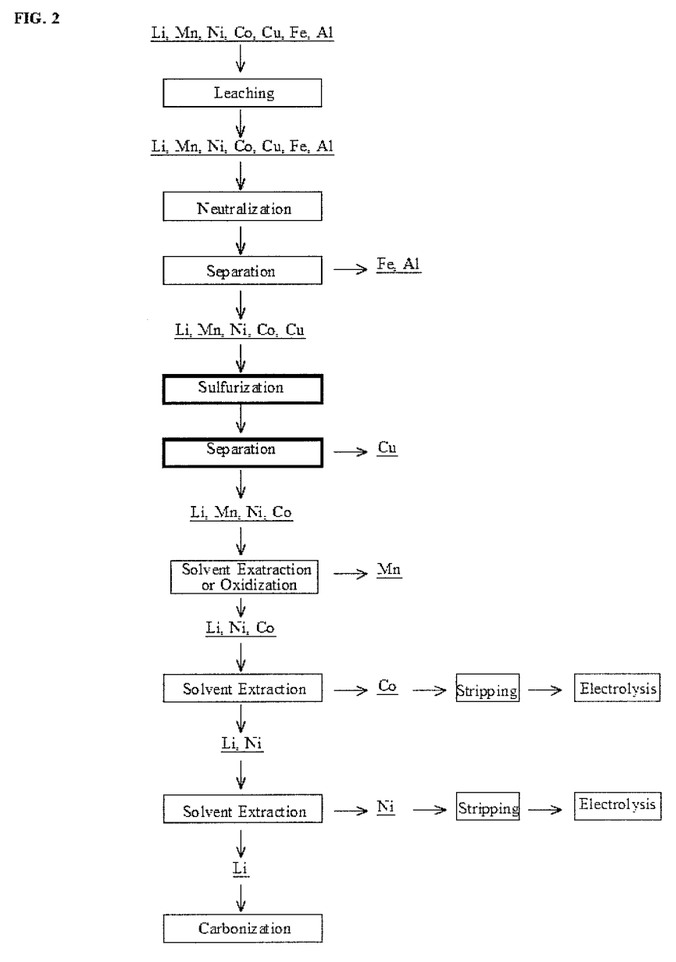
FIG. 2 is a flow chart showing a conventional recovering method.

According to the embodiment as shown in FIG. 1, copper is not contained in the leached solution and it will be thus unnecessary to perform sulfurization and separation which have been carried out in order to remove copper after removing iron and aluminum in the conventional method as shown in FIG. 2. Therefore, the processing efficiency in the treating process of the lithium ion battery scrap for recovering such valuable metals can be significantly improved and the costs required for sulfurization and separation can be effectively reduced.

Also, a large amount of copper is contained in the solution during electrolysis for recovering cobalt will cause abnormal electrodeposition. Therefore, by this time, it is necessary to reduce the copper ion concentration to a certain low value such as about 0.5 mg/L or less. According to this embodiment, copper can be sufficiently removed in the previous copper separating step, thereby reliably preventing occurrence of such electrodeposition abnormality.

Figure 3:
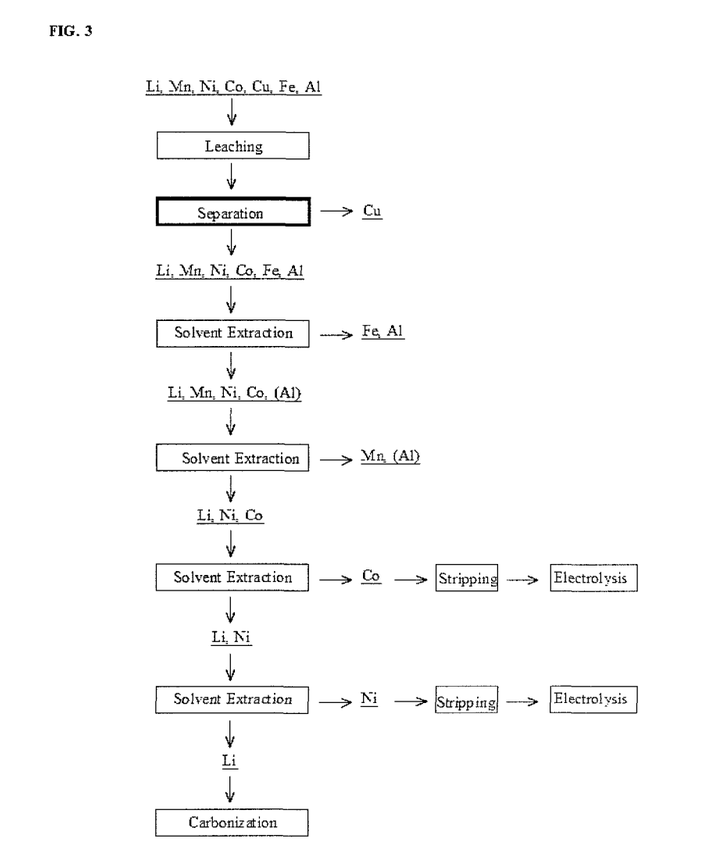
FIG. 3 is a flow chart showing another embodiment of the metal recovering method according to the present invention.

FIG. 3 shows another embodiment of the metal recovery method of the present invention.

In the embodiment shown in FIG. 3, the leaching of the lithium ion battery scrap to obtain the leached solution is the same as shown in FIG. 1, with the exception that a part of iron and aluminum is removed from the leached solution by solvent extraction and further solvent extraction is then carried out to remove manganese and remaining aluminum. The subsequent recovery of lithium, nickel and cobalt remaining in the solution is the same as shown in FIG. 1.

Figure 4:
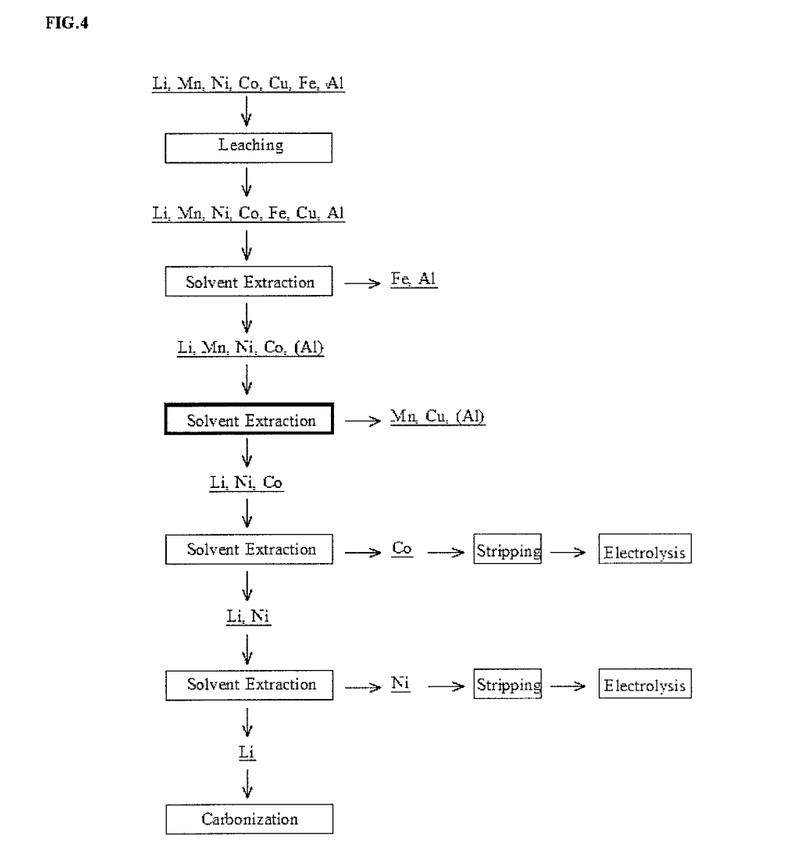
FIG. 4 is a flow chart showing another conventional recovering method.

In this embodiment, any load of copper removal during solvent extraction of manganese can be reduced, as can be seen from comparison with the conventional method shown in FIG. 4.

EXAMPLE

The method of the present invention was experimentally conducted and its effects were confirmed as described below. However, the description herein is merely for the purpose of illustration and is not intended to be limited thereto.

Battery powder and a positive electrode active material (LCO) containing each metal in the amount shown in Table 1 were prepared.

TABLE 1

|  | Composition (wt %) | | | | | | | |
| --- | --- | --- | --- | --- | --- | --- | --- | --- |
|  | Mn | Co | Ni | Li | Cu | Fe | Al | Zn |
| Battery Powder | 0.41 | 33.9 | 0.65 | 3.71 | 5 | 1 | 8.6 | 0.18 |
| Positive Electrode Active Material | 0.92 | 58.6 | 1.8 | 6.9 | 0 | 0 | 0 | 0 |

Example 1

In Example 1, 30 g of the above battery powder and sulfuric acid of 1 time equivalent to an amount required for leaching all the metal components were added to 300 mL of pure water, and each metal component was leached at a solution temperature of 60° C. and under an agitation speed of 250 rpm, and changes in the pH and ORP as well as concentration changes in cobalt, aluminum and copper over time were evaluated. Here, the leaching rate of each metal component was calculated by comparison with the same sample with the exception that the metal components were completely leached with aqua regia. The results are shown in Table 2 and FIG. 5.

Figure 5:
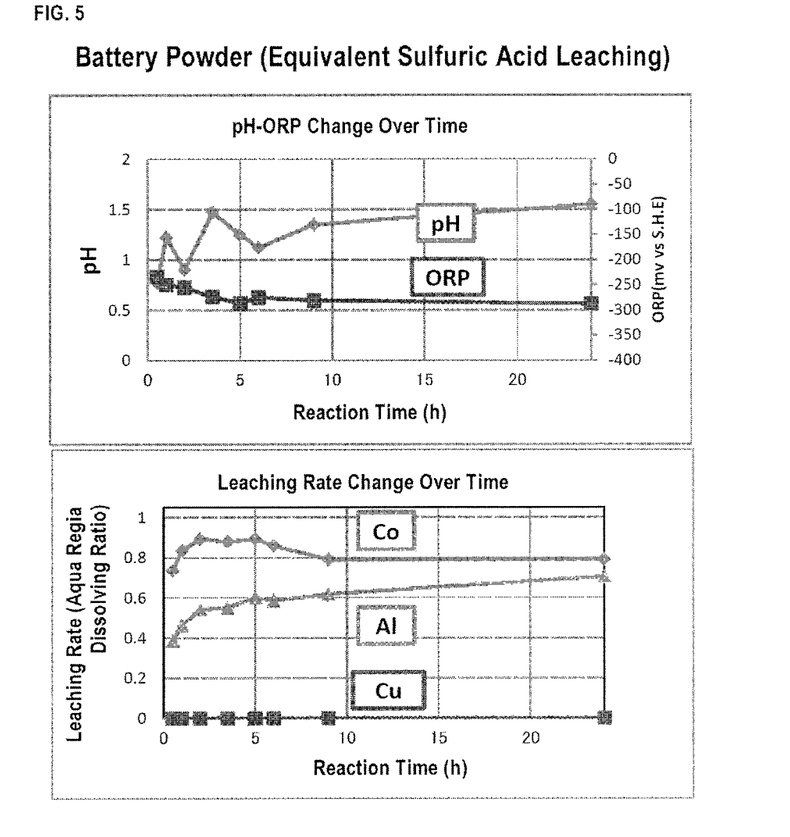
FIG. 5 is graphs each showing changes in pH and ORP and a change in concentration of each metal component in Example 1.

As can be seen from Table 2 and FIG. 5, the leaching rate of aluminum was increased from the start of leaching, whereas the leaching rate of copper was maintained at substantially zero. Also, a relatively large amount of cobalt was leached.

TABLE 2

| Reaction | Metal Component Contained | | |
| --- | --- | --- | --- |
| Time (h) | Co | Cu | Al |
| 0.5 | 73% | 0% | 39% |
| 1 | 83% | 0% | 46% |
| 2 | 89% | 0% | 54% |
| 3.5 | 88% | 0% | 55% |
| 5 | 89% | 0% | 60% |
| 6 | 86% | 0% | 59% |
| 9 | 79% | 0% | 62% |
| 24 | 79% | 0% | 71% |

Example 2

In Example 2, to 300 ml of pure water were added the positive electrode active material as stated above, 1N sulfuric acid in an amount required for leaching all the metal components and further powder of a copper foil and an aluminum foil. Each metal element was then leached in the same method as in Example 1, and changes in the pH and ORP as well as concentration changes in cobalt, aluminum and copper were determined over time. The results are shown in Table 3 and FIG. 6. Here, the amount of the positive electrode active material added was 17.35 g such that the amount of cobalt in the added positive electrode active material was equal to that of cobalt in 30 g of battery powder. Further, the amounts of the added copper foil and aluminum foil were 1.5 g for the copper foil and 2.37 g for the aluminum foil such that the amounts were equal to those of copper and aluminum in 30 g of battery powder, respectively.

Figure 6:
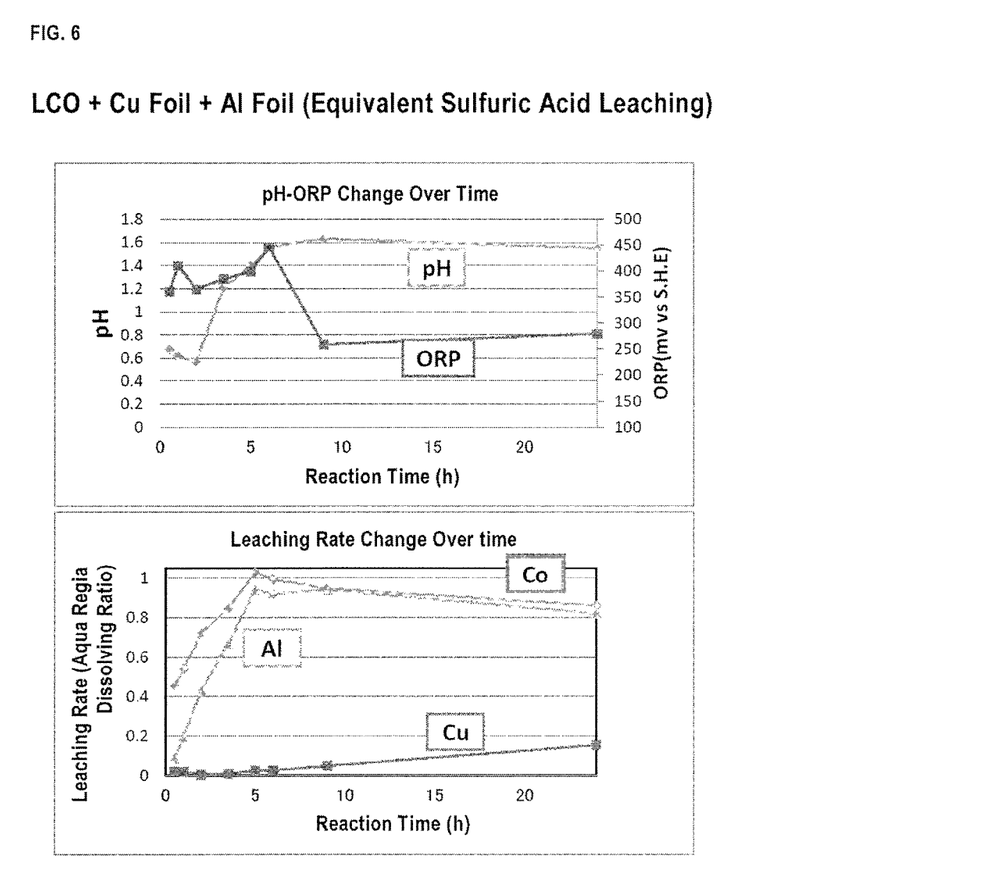
FIG. 6 is graphs each showing changes in pH and ORP and a change in concentration of each metal component in Example 2.

As can be seen from the results shown in Table 3 and FIG. 6, the leaching rates of aluminum and cobalt were increased from the start of leaching, whereas the leaching rate of copper was maintained at the lower level, but after leaching most of aluminum, the leaching rate of copper was also increased. Further, the leaching rate of cobalt was maintained at the higher level until most of aluminum was leached.

TABLE 3

| Reaction Time (h) | Co | Cu | Al |
| --- | --- | --- | --- |
| 0.5 | 45% | 2% | 8% |
| 1 | 54% | 2% | 20% |
| 2 | 72% | 0% | 43% |
| 3.5 | 84% | 1% | 67% |
| 5 | 103% | 3% | 94% |
| 6 | 99% | 3% | 92% |
| 9 | 95% | 5% | 94% |
| 24 | 86% | 15% | 82% |

Comparative Example 1

In Comparative Example 1, the same test as that of Example 2 was conducted with the exception that the copper foil was added without adding the aluminum foil, and changes in the pH and ORP as well as concentration changes in cobalt and copper over time were determined. The results are shown in Table 4 and FIG. 7.

Figure 7:
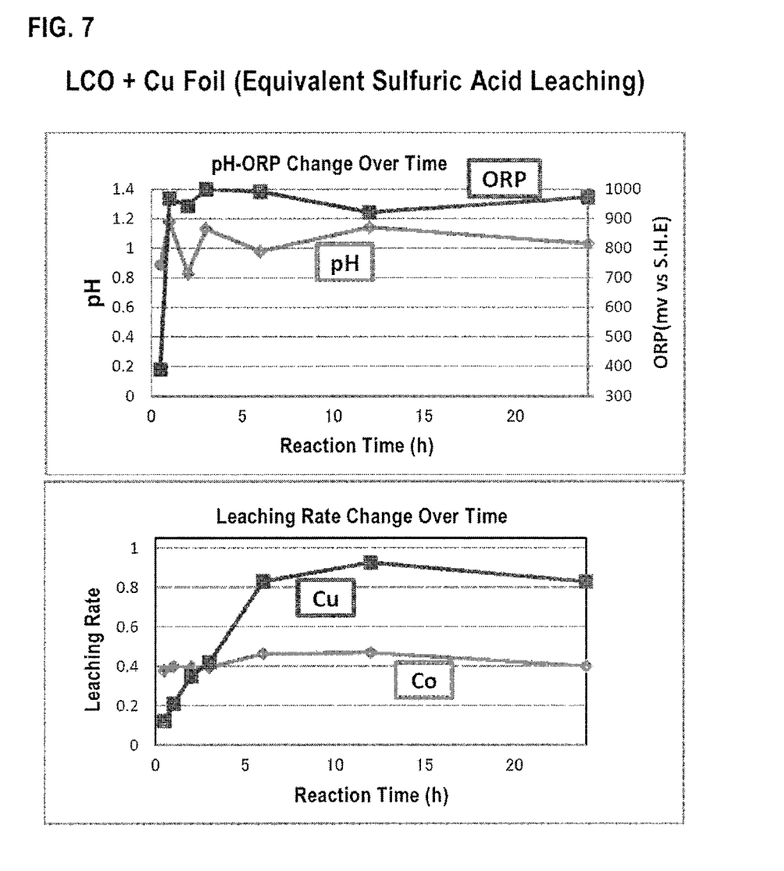
FIG. 7 is graphs each showing changes in pH and ORP and a change in concentration of each metal component in Comparative Example 1.

As can be seen from the results shown in Table 4 and FIG. 7, the leaching rate of copper was increased from the start of leaching because the aluminum foil was not added, thereby leaching an increased amount of copper and leaching a decrease amount of cobalt.

TABLE 4

| Reaction Time (h) | Co | Al |
| --- | --- | --- |
| 0.5 | 73% | 39% |
| 1 | 83% | 46% |
| 2 | 89% | 54% |
| 3.5 | 88% | 55% |
| 5 | 89% | 60% |
| 6 | 86% | 59% |
| 9 | 79% | 62% |
| 24 | 79% | 71% |

Comparative Example 2

In Comparative Example 2, the same test as that of Example 2 was conducted with the exception that the aluminum foil was added without adding the copper foil, and changes in the pH and ORP as well as concentration changes in cobalt and aluminum over time were determined. The results are shown in Table 5 and FIG. 8.

Figure 8:
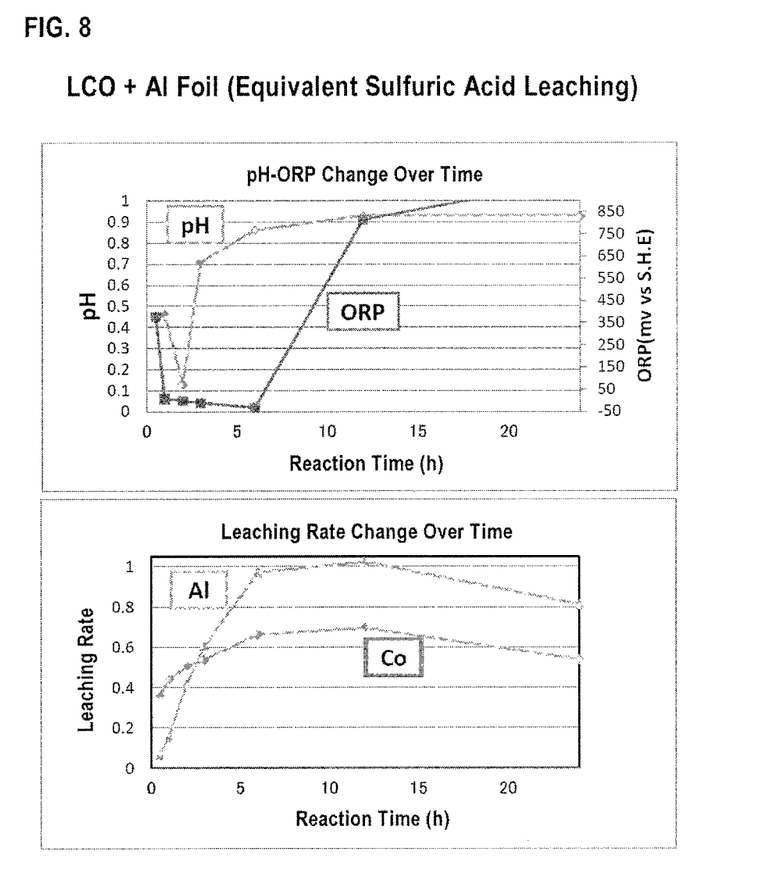
FIG. 8 is graphs each showing changes in pH and ORP and a change in concentration of each metal component in Comparative Example 2.

In the results shown in Table 5 and FIG. 8, the leaching rate of aluminum was higher, but the leaching rate of cobalt was not increased so much.

TABLE 5

| Reaction Time (h) | Co | Al |
|---|---|---|
| 0.5 | 36% | 6% |
| 1 | 44% | 16% |
| 2 | 50% | 42% |
| 3 | 54% | 61% |
| 6 | 66% | 97% |
| 12 | 70% | 102% |
| 24 | 54% | 81% |

Comparative Example 3

In Comparative Example 3, the same test as that of Example 2 was conducted with the exception that neither copper foil nor aluminum foil was added, and changes in the pH and ORP as well as a concentration change in cobalt over time were determined. The results are shown in Table 6 and FIG. 9.

Figure 9:
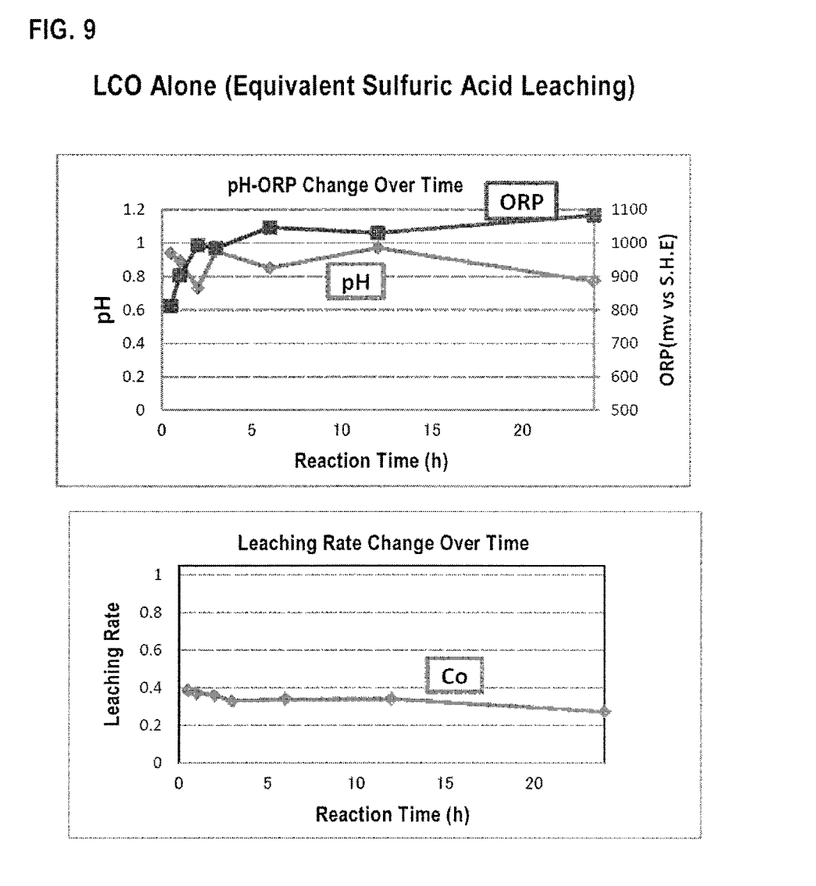
FIG. 9 is graphs each showing a change in pH and ORP and a change in concentration of a metal component in Comparative Example 3.

In this case, the leaching rate of cobalt was maintained at the lower level throughout the reaction time.

TABLE 6

| Reaction Time (h) | Co |
|---|---|
| 0.5 | 39% |
| 1 | 37% |
| 2 | 36% |
| 3 | 33% |
| 6 | 34% |
| 12 | 34% |
| 24 | 27% |

The above tests demonstrate that according to the method of the present invention, copper can be effectively separated and removed from the acidic solution while suppressing the leaching rate to the sufficiently lower level, by leaching the lithium ion battery scrap containing copper under the condition that the aluminum solid is present in the acidic solution.

What is claimed is:

1. A method for removing copper from lithium ion battery scrap containing copper, comprising:
    adding the lithium ion battery scrap to an acidic solution and leaching the lithium ion battery scrap under a condition that an aluminum solid is present in the acidic solution; and
    separating copper as a solid from the acidic solution after leaching,
    wherein leaching is terminated before the aluminum solid in the acidic solution completely dissolves and copper contained in the lithium ion battery scrap starts to dissolve.

2. The method for removing copper from lithium ion battery scrap according to claim 1, wherein, the aluminum solid present in the acidic solution is aluminum powder contained in the lithium ion battery scrap.

3. The method for removing copper from lithium ion battery scrap according to claim 1, wherein the condition is created by adding the aluminum solid to the acidic solution.

4. The method for removing copper from lithium ion battery scrap according to claim 1, wherein the lithium ion battery scrap contains nickel and/or cobalt.

5. The method for removing copper from lithium ion battery scrap according to claim 4, wherein, an amount of the aluminum solid present in the acidic solution is adjusted such that aluminum remains as a solid after nickel and/or cobalt in the lithium ion battery scrap is completely dissolved.

6. The method for removing copper from lithium ion battery scrap according to claim 4, wherein, a pH of the acidic solution when dissolving nickel and/or cobalt in the lithium ion battery scrap is from 0 to 2.0, and wherein, a pH of the acidic solution when separating the copper solid from the acidic solution is from 2.0 to 3.0.

7. A method for recovering at least one metal from a lithium ion battery scrap containing copper, comprising:
    adding the lithium ion battery scrap to an acidic solution and leaching the lithium ion battery scrap under a condition that an aluminum solid is present in the acidic solution;
    separating copper as a solid from the acidic solution after leaching, to separate a leached residue from a leached solution; and
    recovering the at least one metal contained in the leached solution, after separating copper,
    wherein leaching is terminated before the aluminum solid in the acidic solution completely dissolves and copper contained in the lithium ion battery scrap starts to dissolve.

* * * * *